United States Patent
Berriman

[15] 3,669,879
[45] June 13, 1972

[54] FLUID SEPARATION APPARATUS AND METHOD

[72] Inventor: Lester P. Berriman, Arcadia, Calif.
[73] Assignee: Dresser Industries, Inc., Santa Ana, Calif.
[22] Filed: Dec. 15, 1969
[21] Appl. No.: 885,099

Related U.S. Application Data

[63] Continuation-in-part of Ser. No. 652,920, July 12, 1967, abandoned.

[52] U.S. Cl..................................................210/23, 210/321
[51] Int. Cl. .................................B01d 31/00, B01d 13/00
[58] Field of Search....................210/22, 23, 321, 345, 346, 210/331, 380, 500; 55/16, 158

[56] References Cited

UNITED STATES PATENTS

| | | |
|---|---|---|
| 550,073 | 11/1895 | Isaacs...............................210/500 X |
| 2,422,882 | 6/1947 | Bramley.............................55/16 X |
| 3,396,103 | 8/1968 | Huntington.......................210/321 X |
| 3,398,833 | 8/1968 | Marks et al.........................210/321 |
| 3,400,074 | 9/1968 | Grenci..............................210/321 X |
| 3,419,144 | 12/1968 | Huntington.......................210/321 X |

FOREIGN PATENTS OR APPLICATIONS 376,375   11/1939   Italy.....................................210/321

*Primary Examiner*—Frank A. Spear, Jr.
*Attorney*—Lindenberg, Freilich & Wasserman

[57] ABSTRACT

A separation process of the reverse osmosis type useful for generating fresh water by forcing salt water against a semipermeable membrane that allows only pure water to pass, which uses centrifugal forces created by rotating basket to build up a pressure head of water supplied to the basket to force water through the membrane. The pure water can be expelled by a nozzle in a direction to help rotate the basket. The membrane can be in the form of a spiral or layers extending perpendicular to the axis, to increase the membrane area within a basket of given size. The membranes can extend radially with respect to the axis of rotation, and supply and removal conduits can be positioned to continually flow water in an outward radial direction to prevent the build-up of polarization layers on the membrane surfaces.

20 Claims, 15 Drawing Figures

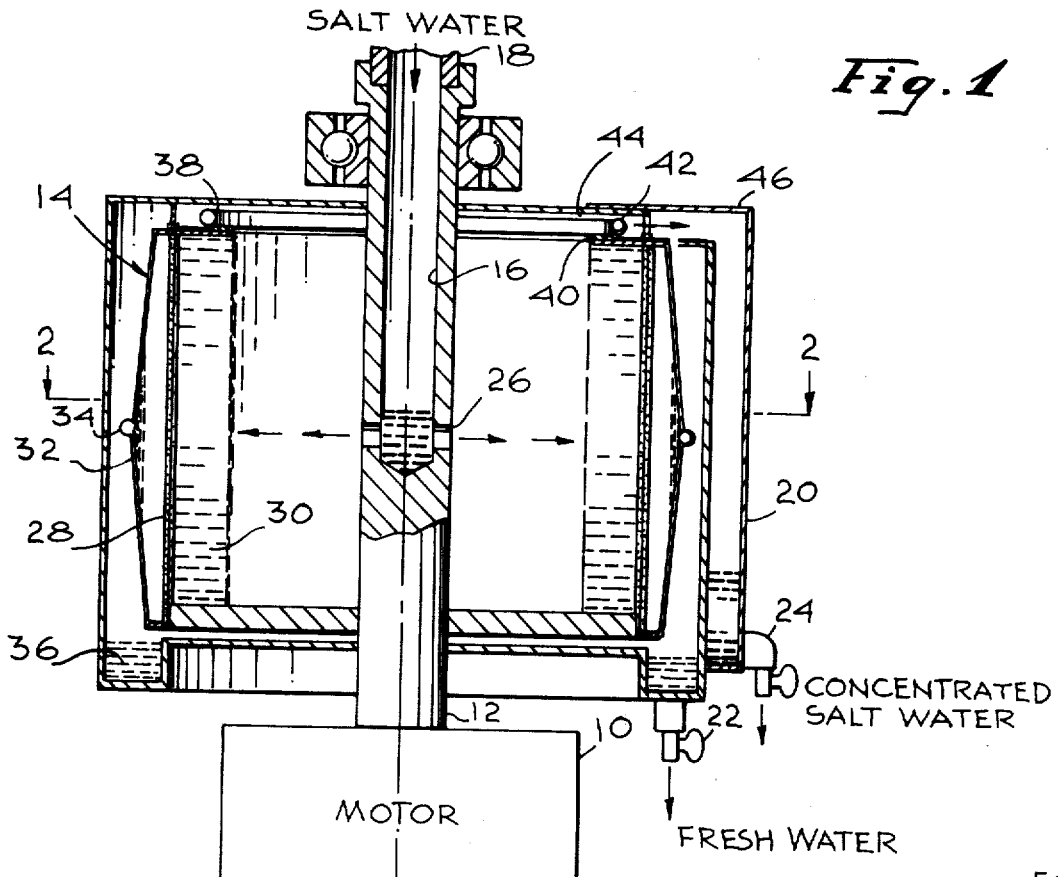
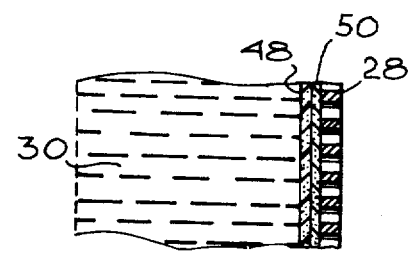
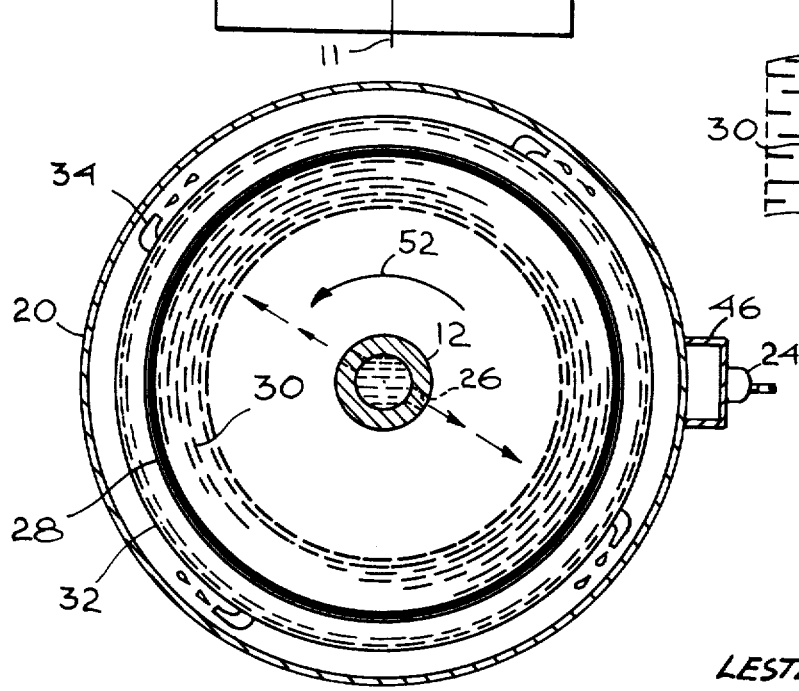
INVENTOR.
LESTER P. BERRIMAN
BY
Lindenberg & Freilich
ATTORNEYS INVENTOR.
LESTER P. BERRIMAN
BY
Lindenberg & Freilich
ATTORNEYS

INVENTOR.
LESTER P. BERRIMAN

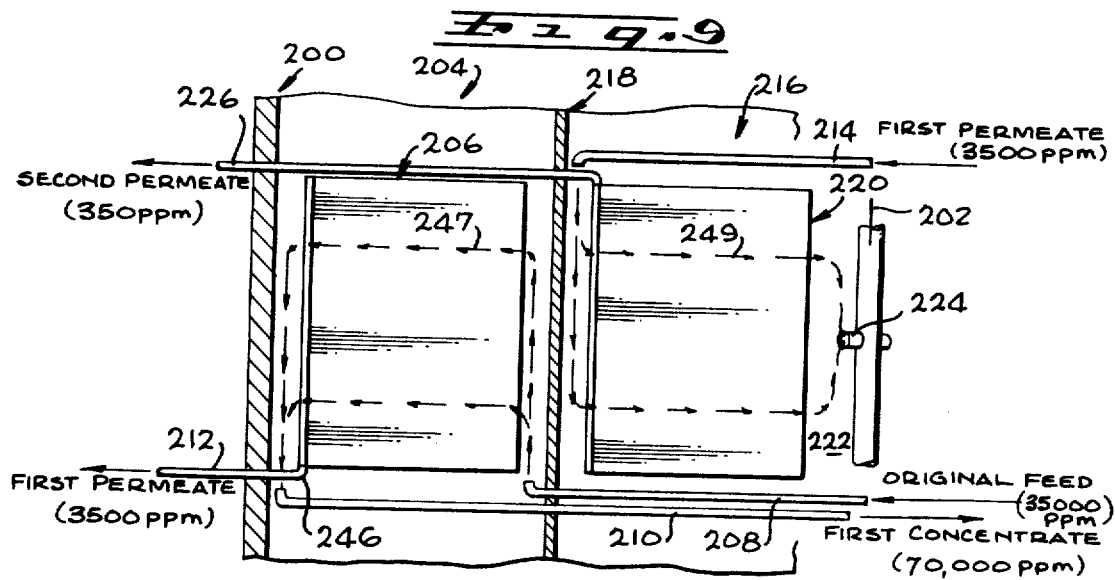
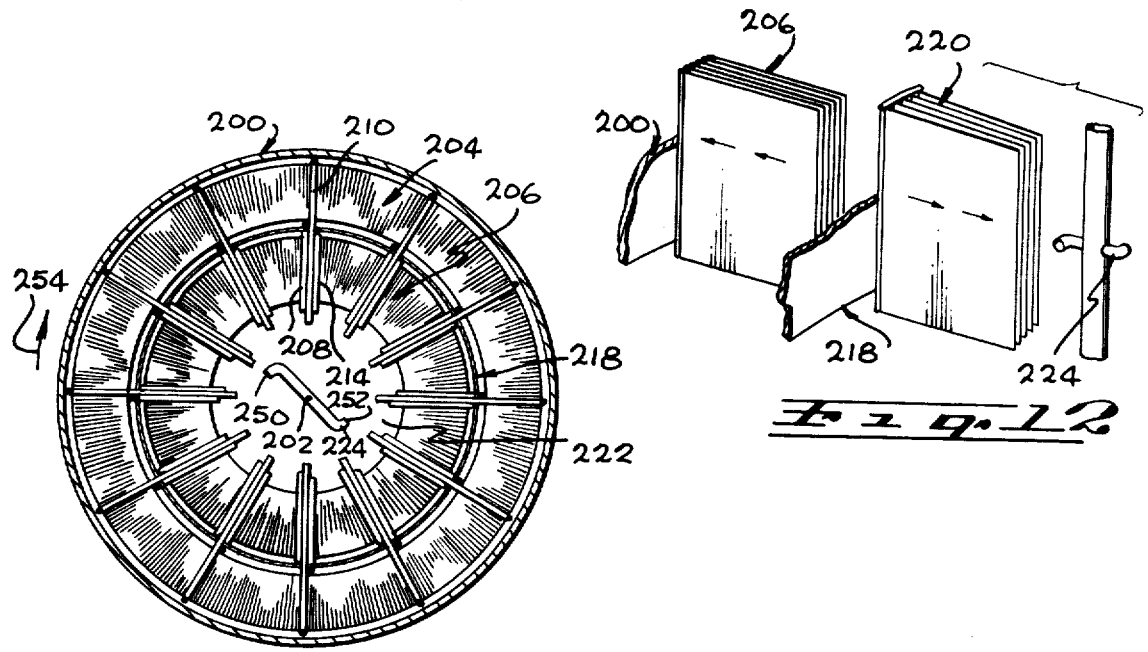

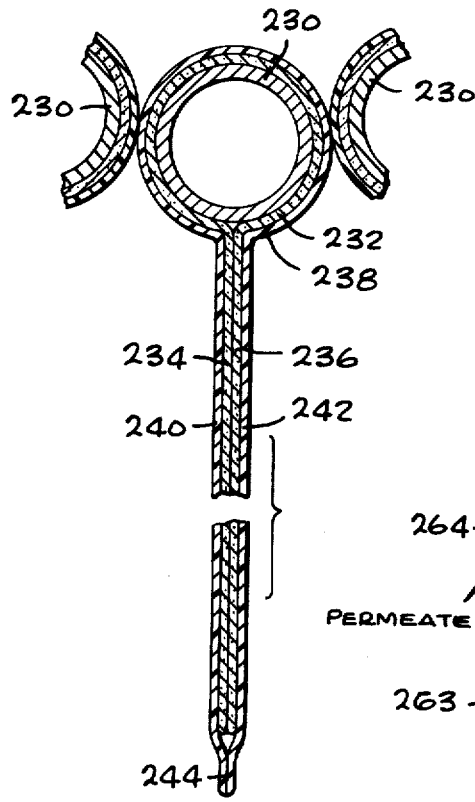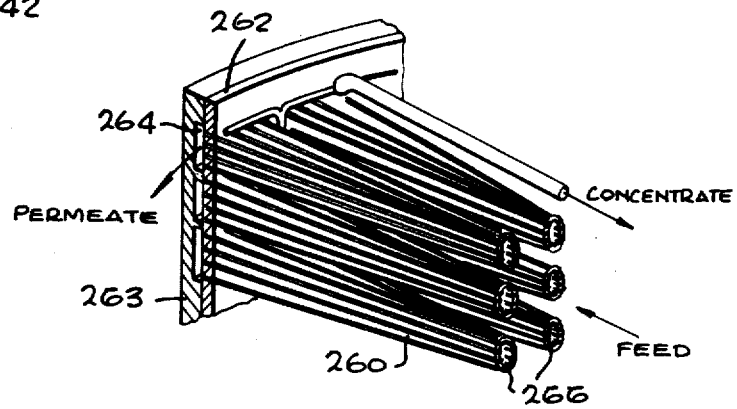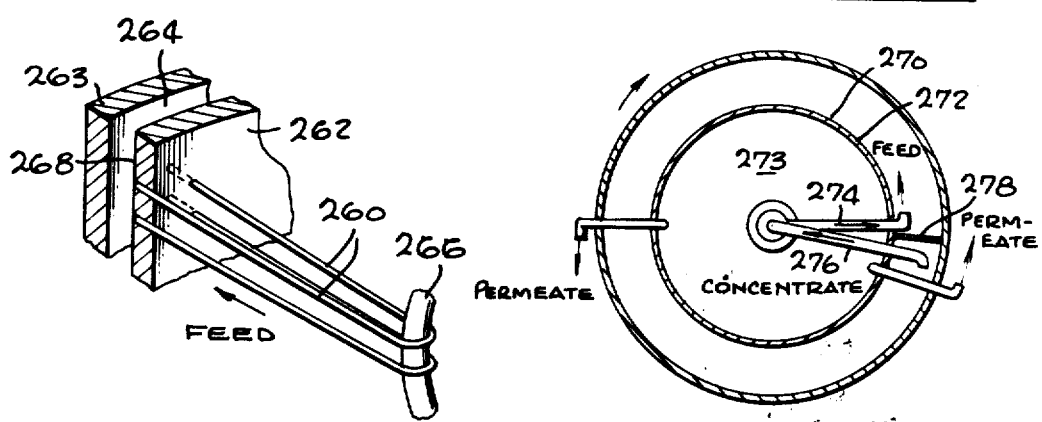

3,669,879

FLUID SEPARATION APPARATUS AND METHOD

CROSS-REFERENCE TO RELATED APPLICATION

This is a continuation-in-part of patent application Ser. No. 652,920, filed July 12, 1967 by Lester P. Berriman, entitled FLUID SEPARATION APPARATUS AND METHOD, now abandoned.

BACKGROUND OF THE INVENTION

This invention relates to a fluid separation apparatus and method of the type wherein fluid is forced against a membrane which allows only certain constituents to pass.

Numerous processes are known for the separation or purification of fluids from solutions with solids or other fluids. One of the greatest needs in this area is to provide means for separating pure water from salt or brackish water, or from sewage effluent.

One of the most promising methods for separating suspended and dissolved material in aqueous solution is reverse osmosis wherein water is forced through a semipermeable membrane, the membrane being permeable to water but not to dissolved solids. The reverse osmosis process is inherently simple and, unlike many other processes, no phase change is involved. Therefore, there is promise for holding energy costs to an extremely low level. Among the more serious drawbacks to the use of reverse osmosis is that very high pressures must be used to force water through the membrane to obtain even a small flow of pure water. Pressures on the order of thousands of pounds per square inch and more, which must often be employed, normally necessitate high pressure vessels and pumps, thereby requiring large capital investment. Furthermore, large quantities of the salt water must be highly pressurized to provide for only a moderate flow of pure water, resulting in a high operating cost.

OBJECTS AND SUMMARY OF THE INVENTION

One object of the present invention is to provide a method and means for purification of fluids by forcing fluid against a membrane which removes dissolved components by allowing only the pure fluid to pass.

Another object of the present invention is to provide an arrangement for water purification by forcing water through a semi-permeable membrane, wherein a maximum of energy expended in providing high pressures is recovered.

The foregoing and other objects are realized in one embodiment of the present invention by utilizing a centrifuge-type machine wherein saline or otherwise impure water or other solution comprising a solvent or solvents and various solutes, is fed to a rotating basket that produces high pressure by centrifugal force. Semi-permeable membranes are established near the periphery of the rotating basket where a large pressure head of water is created. The high pressure pushes a portion of the solution through the membranes, the semi-permeable nature of the membranes allowing primarily pure solvent to flow through, thereby concentrating the remaining solution. After flowing through the membranes, the pure solvent passes from the rotating basket through nozzles attached to the basket and facing tangentially to the rotation of the basket and opposite to the direction of rotation.

The centrifuge apparatus results in the production of very high pressures with a minimum of equipment. The outlet jets through which pure solutions leave the basket serve to jet-propel the basket to maintain its rotary motion, thereby enabling the recovery of some of the rotational energy supplied to the system and increasing efficiency. The centrifuge apparatus is adaptable to both continuous and batch processing systems.

Various embodiments of the invention may be employed to increase the flow rates and efficiency. In one embodiment, the membrane is merely a thin cylinder placed near the periphery of the basket and around all of the fluid contained therein. In another embodiment, the membranes are stacked in ring-shaped layers, and pure fluid must flow primarily parallel to the axis of the basket, thereby enabling the use of greater areas of membrane, although pressures vary somewhat throughout the thickness of the membranes. In another embodiment, a spiral-wound membrane is located near the periphery of the basket for enabling the use of large areas of membrane, and therefore to maintain high flow rates, while providing for substantial pressure throughout the thickness of the membrane. These and other arrangements may be employed in various applications to obtain high efficiency and high flow rates with a minimum of equipment.

The novel features of the invention are set forth with particularity in the appended claims. The invention will be best understood from the following description when read in conjunction with the accompanying drawings.

BRIEF DESCRIPTION OF THE DRAWINGS

FIG. 1 is a side sectional view of one embodiment of the invention;

FIG. 2 is a top sectional view taken along the line 2—2 of FIG. 1;

FIG. 3 is a partial sectional view showing the membrane and support portions of the embodiment of FIG. 1;

FIG. 9 is a partial side view of another embodiment of the invention, which employs radially extending sheet-like membranes;

FIG. 10 is a plan view of the embodiment of FIG. 9;

FIG. 11 is a sectional top view of a membrane assembly of the embodiment of FIG. 9;

FIG. 12 is a partial perspective view of the embodiment of FIG. 9;

FIG. 13 is a partial perspective view of another embodiment of the invention, which employs radially extending hollow fine fiber membranes;

FIG. 14 is a partial perspective view of the embodiment of FIG. 13; and

FIG. 15 is a simplified plan view of another embodiment of the invention wherein feed water to be purified is applied to the radially outer side of a membrane.

DESCRIPTION OF THE PREFERRED EMBODIMENTS

Figure 4:
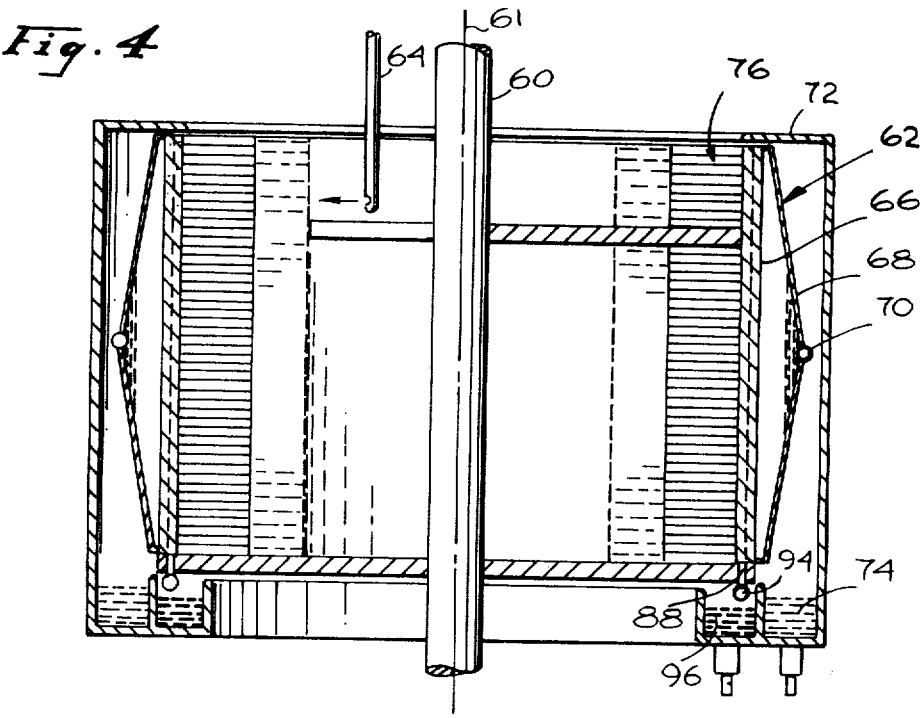
FIG. 4 is a sectional side elevation view of another embodiment of the invention.

The fluid separation apparatus and method of this invention is applicable to a variety of fluids. However, one of the more important applications is in the separation of fresh water from sea water, and the following description will deal with this application for illustrative purposes.

FIG. 1 shows a side sectional view of one embodiment of the invention comprising a motor 10 having a shaft 12 to which is attached a rotatable basket 14. The motor rotates the basket at a high rotational speed about the axis of rotation 11 of the basket to create large centrifugal forces. The shaft 12 is hollow so as to form an axial tube 16 for carrying water to the bas-ket. Salt water enters the apparatus through a tube 18 which is connected to the axial tube 16 in the shaft. The products generated by the apparatus are fresh water and concentrated salt water, which exit from the apparatus through a stationary shroud 20 which surrounds the basket. Fresh water flows out through a fresh water valve 22 connected to the shroud and high salt content, or concentrated, salt water flows out through a concentrated salt water valve 24 connected to the shroud.

As may be seen also in FIG. 2, water entering the apparatus through the tube 18 and axial tube 16 in the shaft passes through outlet holes 26 in the shaft and flies toward the periphery of the basket. A cylindrically-shaped support 28 of the basket contains the water flowing radially outwardly from the outlet holes 26 and a thick layer of salt water 30 gathers radially inwardly of the support. The support 28 backs up the semi-permeable membrane through which pure water passes to obtain fresh water. After passing through the membrane and support 28 the fresh water moves radially outward to an annular collection wall 32 of the basket, and to nozzles 34 attached to the most radially outward parts of the collection wall. The fresh water leaves the basket through the nozzles 34 and falls down the walls of the shroud 20 to a fresh water reservoir 36. The fresh water then flows out of the apparatus through the fresh water valve 22 which is connected to the fresh water reservoir.

The water remaining on the radially inward side of the support 28 of the basket becomes highly concentrated with salt, since salt does not flow through the membrane. In order to reduce the concentration of salt, water is continuously added to the basket at a considerably higher rate than it passes through the membrane. The new salt water constantly mixes with the highly concentrated salt water so that the water on the radially inward side of the support 28 has a salt concentration close to that of the original salt water which enters the apparatus. The excess water added to the system is withdrawn by providing an overflow ring 38 on the basket for receiving excess water. Excess water flows from the layer 30 over an obstruction 40 and into the ring 38. Nozzles 42 at the periphery of the ring pass the concentrated salt water into a concentrated salt water collection ring 44 in the shroud, which is connected to a concentrated water outlet tube 46 in the shroud. The concentrated salt water valve 24 enables removal of the concentrated salt water from the system.

The support 28 supports a membrane apparatus which is shown more clearly in the partial view of FIG. 3. The support 28 is of grid-like construction so as to provide large open areas through which fresh water can pass. A porous membrane backup 50 is positioned on the radially inward side of the support 28, and a semi-permeable membrane 48 is positioned on a radially inward side of the backup 50. The membrane 48 may be constructed of a material such as cellulose acetate, in a form which allows water to pass but stops the dissolved solids and thereby separates fresh water from its salt content. The membrane is structurally weak and must be backed up by a backup 50 which is a highly porous sheet of material of high structural strength, the holes therein being small so that only small areas of the membrane are unsupported.

Power must be continuously supplied to the shaft 12 to rotate the water which is continuously added to the basket. In accordance with this invention, some of this energy is recovered by using nozzles to direct the emerging water opposite to the direction of rotation and thereby provide water jets to help maintain rotation. As can be seen more clearly in FIG. 2, the nozzles 34 through which the fresh water emerges are directed tangentially to the direction of motion of the basket, indicated by arrow 52, and opposite to this direction so that the reaction forces of the jets of emerging water help to rotate the basket. The nozzles 42 (shown in FIG. 1) through which concentrated salt water emerges are similarly directed opposite to the direction of rotation of the basket. Thus, a portion of the energy which must be supplied to the water to rotate it is recovered and efficiency of the system is increased.

It should also be noted that, unlike reverse osmosis purification apparatus available heretofore, substantial water pressure forcing water through the membrane exists throughout the thickness of the membrane, including the portion where fresh water emerges. This is, of course, due to the fact that centrifugal force is used which is applied throughout the entire thickness of the membrane, because the membrane material is positioned normal to lines radiating from the axis of rotation of the basket. As a result, the membrane is utilized more efficiently to provide for higher flow rates, even for relatively thick membranes.

Figure 5:
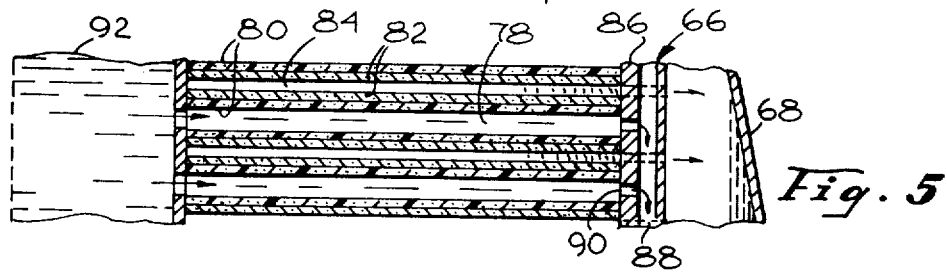
FIG. 5 is a partial sectional view of the embodiment shown in FIG. 4.

Another embodiment of the invention, shown in FIGS. 4 and 5, provides a scheme for allowing a large area of membrane to be used in a relatively small centrifuge-like device. In the apparatus shown in FIG. 4, a solid shaft 60 rotates a basket 62 which holds salt water to be purified. Water is added to the basket through a stationary tube 64, from which it flows radially outward toward a support 66 and from there to a collection wall 68. Nozzles 70 at the radially outward portion of the collection wall eject the fresh water, which flows down the sides of a stationary shroud 72 to a fresh water reservoir 74.

The membrane structure and support 76 of the apparatus of FIG. 4 can be seen most clearly in FIG. 5. The membrane structure comprises a stack of filters, each one having a ring or annular shape, with the plane of the membranes extending substantially normal to the axis of rotation 61 of the basket. Each filter comprises an annular channel 78 for carrying salt water to be purified, semi-permeable membranes 80 of annular shape above and below the channel, a membrane backup ring 82 disposed against the membrane for supporting it while allowing fresh water to pass through, and a fresh water channel 84 for carrying the fresh water which passes through the membrane. A cylindrical support 86 is surrounding the membrane structure withstands the centrifugal force of the water within it. A concentrated salt water tube 88 disposed on the radially outer side of the cylinder 86 connects, through holes 90 in the cylinder and through channels 78, to the salt water 92. Salt water 92 which has been fed into the basket flows radially outward through the channels 78 from which the separated fresh water portion flows axially through the membranes 80 into the fresh water channels 84. The fresh water then flows through holes (not shown) in the cylinder 86 into the chamber formed by the collection wall 68, where it is ejected through nozzles, as described above. The salt remaining after fresh water flows through the membranes 80, mixes with the salt water and flows through holes 90 in the cylinder 86 into the concentrated salt water tube 88. As shown in FIG. 4, the tube 88 carries the concentrated salt water down to a nozzle 94 which ejects the water tangentially to the direction of rotation of the basket and allows the water to fall into a concentrated salt water reservoir 96.

The embodiment of the invention shown in FIGS. 4 and 5 does not provide for the maintenance of a uniform water pressure throughout the entire thickness of the membranes, but does allow for the application of high pressures with simple equipment, and enables the use of a large area of membrane within a relatively small apparatus.

Figure 6:
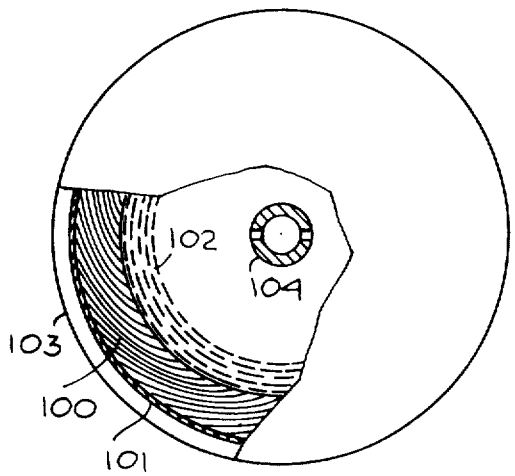
FIG. 6 is a plan view, partly in section, of another embodiment of the invention.

Still another embodiment of the invention is illustrated in FIG. 6, wherein a spiral-wound membrane structure 100 is used, which is supported by support 101, the entire apparatus being covered by a shroud 103. In the embodiment of FIG. 6, salt water 102 emerges from a hollow shaft 104 and flows against the membrane structure 100. Fresh water flows through the membrane structure and is captured with apparatus similar to those of the embodiment described above. The membrane structure 100 comprises alternate layers of membrane and spacers for supporting or backing them up. The water flows through the membranes and along the spiral channels formed by the spacers or backups radially outward to where it is collected. The spiral design enables the use of a large area of membrane in a relatively small device, yet also provides for the maintenance of substantial pressure of water throughout the entire thickness of the membrane, as is provided in the apparatus of FIGS. 1 through 3.

Figure 7:
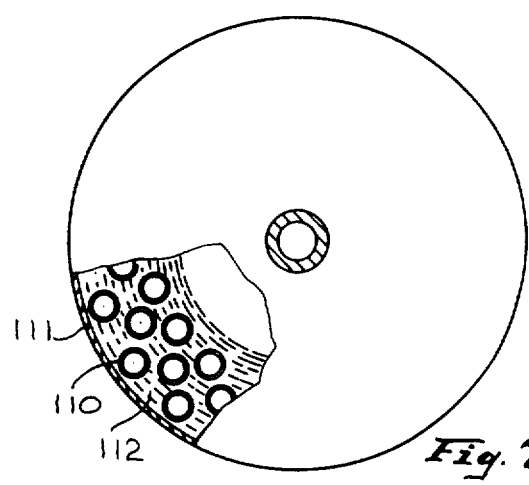
FIG. 7 is a plan view, partly in section, of another embodiment of the invention.

In still another embodiment of the invention, shown in FIG. 7, a multiplicity of tubes 110 is positioned near the radially outward area of a basket 111, the tubes being immersed in the salt water 112 to be purified. Each tube comprises a cylindrically-shaped semi-permeable membrane as its outer covering and has a tube of structural material within the membrane for supporting it. Fresh water flows through the membranes and down the tubes where it emerges. Additional tubes (not shown) are provided for carrying away the concentrated salt water.

In order to obtain appreciable flow of fresh water through the membrane, high pressures must be employed by rotating the water basket at high speeds. Generally, no appreciable flow is obtained unless pressures of more than several hundred pounds per square inch are generated, and practical systems require pressures on the order of 1,000 pounds per square inch or more. Thus, for example, a basket three feet in diameter with water filling most of the internal volume would require a speed on the order of 2500 revolutions per minute.

Figure 8:
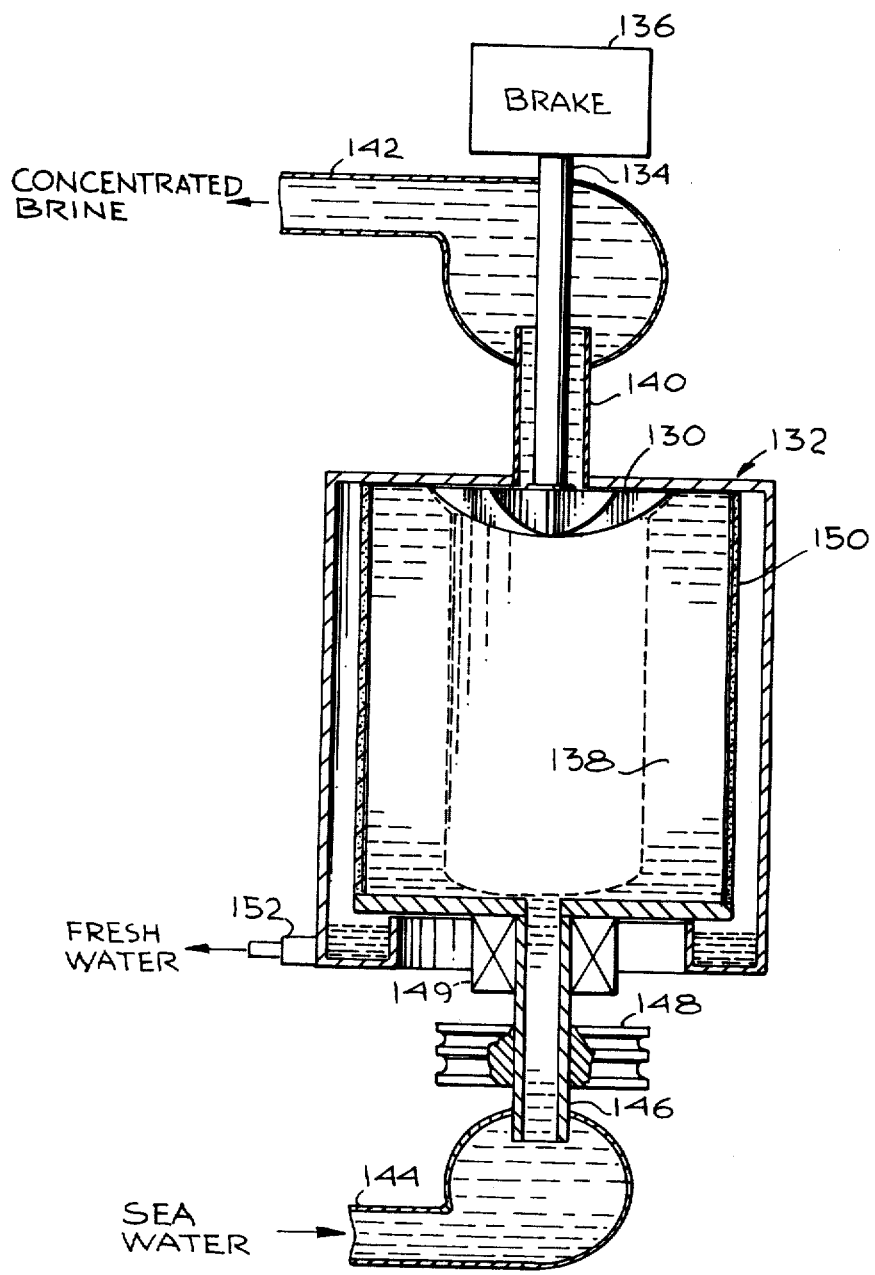
FIG. 8 is a side sectional view of another embodiment of the invention.

In yet another embodiment of the invention shown in FIG. 8, the energy imparted to the sea water by centrifugal action is recovered in still another way. In the embodiment of FIG. 8, both outlet and inlet are through hollow shafts 140 and 146, respectively. Thus, the only energy expended is that actually used in producing flow through the membrane. An impeller 130 is located in the water basket 132 for pumping out concentrated salt water or brine from the basket. The impeller 130 is attached to a shaft 134 leading to a variable speed braking unit, or brake 136. The impeller 130 may be kept stationary or allowed to rotate at various speeds with respect to the water basket 132. As a result, the water 138 in the water basket passes into the impeller 130 and through a tube 140 leading therefrom. The tube leads to a concentrated brine outlet 142 wherein the brine is received under whatever nominal pressure is desired to discharge it from the system.

The remainder of the apparatus of FIG. 8 is largely similar to the previously described apparatus. Sea water enters through an inlet 144 and passes through a hollow shaft 146 into the water basket 132. The hollow shaft 146 is rotated by a chain or belt extending to a pulley 148, and the water basket is supported on a bearing 149. Water entering the water basket passes through a membrane structure 150 to a fresh water outlet 152. The remaining water moves up the water basket and into the impeller 130.

When water having a high concentration of suspended or dissolved impurities is centrifuged, a build-up of impurities often occurs at the surface of the semipermeable membranes. The build-up of dissolved impurities, often referred to as a concentration polarization layer, results from the extraction of the water component from the salt-water admixture at the surface of the membrane, leaving a highly concentrated solution behind it. The polarization layer builds up rapidly when it is attempted to purify such water by using circumferentially extending membrane, by pouring in feed water at the radially inner side of the membrane and taking out relatively pure water on the radially outer side of the membrane. Sea water, which has a dissolved impurity concentration of about 35,000 ppm (parts per million) is sufficiently impure to cause a rapid build-up of impurities under such circumstances and prevent efficient operation of a centrifuge desalination plant.

One way sometimes used to reduce the polarization layer build-up is to provide a constant circulation of water past the membrane surface to scrub it. However, this method is not satisfactory in the foregoing device wherein impure water is fed on the radially inner side of a circumferentially extending membrane. This is because of the higher specific gravity or density, of the water left at the surface of the membrane after pure water flows radially out through the membrane. Where sea water with 35,000 ppm impurities is fed into the device, the layer of water at the membrane surface may have an impurity concentration of more than 100,000 ppm. The membrane is thus in contact with a solution having a much higher salt content and the pressure necessary to overcome the commensurately higher osmotic pressure can approach the applied pressure. This severely reduces the water flux rate through the membrane. The high density of this layer causes it, at the membrane surface, to be forced firmly against the membrane, by centrifugal action. It is thus held by the normal attractive forces plus the centrifugal forces. Accordingly, even a very high flushing rate may not be able to dislodge it, and in any case, the required flow rate is impractical.

In accordance with another embodiment of the invention shown in FIGS. 9–12, an arrangement of membranes is provided which minimizes the build-up of a polarization layer of concentrated solution on the membrane surface. This is accomplished by flowing the feed water in a substantially radial direction over a membrane whose surface extends radially. The concentrated solution is subjected to centrifugal forces tending to move it along the membrane surface as it forms thereon, thereby minimizing the polarization layer. The minimization of the polarization layer build-up not only increases the flux, or flow rate, of water through the membrane, but also increases the salt rejection rate so that purer water is produced.

As shown in FIG. 9, the apparatus may be constructed with two stages contained in a basket 200 which rotates about an axis 202. A first stage 204 includes a multiplicity of radially extending membrane structures 206. An original feed conduit 208 carries sea water to the radially inner end of the membrane structure, and an outlet conduit 210 carries away concentrated sea water. A first permeate conduit 212 carries away the relatively fresh water or permeate which has flowed through the membrane structure 206. Sea water in the original feed conduit 208 typically has a concentration of impurities of 35,000 ppm. After flowing past the membrane structure 206, it has a concentration of about 70,000 ppm. The permeate which passes through the membrane structure 206 has a concentration such as 3500 ppm.

The first permeate flowing through conduit 212 is fed by a pump (not shown) to an inlet conduit 214 of the second stage 216. The second stage 216 has a radially outer wall 218 and membrane structure 220 located within the wall which extend in a radial direction. The conduit 214 which carries the first permeate, which is to be further purified, carries it to the radially outer end of the second purification stage. This water flows in a substantially radially inner direction past the membrane structures 220 to the inner area 222 of the second stage. A skimmer 224 near the axis of rotation 202 picks up the water which has passed over the membrane structures 220 to remove this water from the inner area 222. The water which has passed through the membrane structures 220 is fed out through a second permeate conduit 226.

As mentioned above, the first permeate entering the second stage through conduit 214 may have a concentration such as 3,500 ppm. After flowing past the second membrane structures 220 to inner area 222, it may achieve a concentration such as 7,000 ppm. The second permeate which has flowed through the membranes of the second stage and which is expelled through conduit 226, may have a concentration such as 350 ppm. This concentration is low enough so that it can be readily used for most household purposes. It may be noted that various pumps for circulating water through the apparatus are not shown. Typically, some of the concentrate picked up by the skimmer 224 is fed into conduit 214 to mix with the first permeate while other portions of it are fed to the original feed conduit 208. Pumps for pumping the fluid may be contained in the basket 200 near the axis of rotation, or outside of the basket.

Each of the membrane structures 206 or 220 has the form shown in FIG. 11. The structure includes a collecting pipe 230 constructed of porous material such as a woven fiberglass with only a small proportion of binding resins. A long sheet of light, porous backing material 232 has a center portion wrapped almost 360° about the pipe, and opposite ends 234 and 236 extending in a radial direction in the desalination apparatus. A sheet 238 of semi-permeable membrane material is wrapped about the porous backing material, and it has two ends 240 and 242 extending in a radial direction with extreme tips 244 heat sealed or otherwise bonded together. The membrane structure is located with the pipe 230 at the radially outer end of the structure and the tips 244 of the membranes at the radially inner end. For the membrane structure 206 in the first stage, a large head of water is built up by centrifugal force applied to the water in the feed pipe 208 and by water in the space where the membrane structure lies. The large pressure resulting from the centrifugal build-up of pressure results in a high pressure on the outer surface of the membrane ends 240, 242. Water flowing through the membranes flows through the backing material 232 to the porous collecting pipe 230. The collecting pipe 230 is connected to a header structure shown at 246 in FIG. 9, which collects the water from many collecting pipes 230 and delivers the water to the first permeate conduit 212.

It can be seen that the water flowing over the membranes of membrane structures 206 in the first stage flow in a substantially radial direction over the surface of the membranes. This flow produces a scrubbing action that removes any polarization layer that tends to build up on the surface of the membrane as pure water is drawn off. Not only does the flow of water, shown by arrow 247, tend to remove the polarization layer, but centrifugal force tends to prevent its formation. The polarization layer has a very high concentration of impurities so that it has a higher density than the water around it. Accordingly, it tends to be thrown radially outwardly. Accordingly, centrifugal force tends to force the polarization layer to break away from the membrane as it forms, and cause it to flow together with the rest of the water which is flowing radially outwardly. The porous backing material 232 and the membrane 240 are constructed of material lighter than sea water so that it and the membrane material tend to float in the water and therefore extend radially inwardly from the collecting pipe 230.

In the case of the second stage 216, it may be noted that the first permeate in conduit 214 is delivered to the radially outer end of the membrane structure 220. This results in the polarization layer build-up tending to be thrown radially outwardly while the water around it flows radially inwardly, as indicated by arrows 249. Accordingly, a counter-current scrubbing action results, which differs from the action in the first stage 204. The counter-current scrubbing action produces greater turbulence and is effective in preventing polarization layer build-up, because the concentration of impurities is lower than in the first stage. Even with the radially inward flow of the second stage, good scrubbing action occurs with a minimum of recirculation to prevent substantial polarization layer build-up.

FIG. 10 illustrates the manner of construction of a complete system. The system is provided with twelve radially-extending baffles angularly spaced about the basket to prevent water from sloshing around and creating unbalance when the basket is not completely filled, and also to prevent dynamic instability and energy loss due to recirculation when the basket is filled. The water at the inner area 222 of the basket is constantly skimmed by the skimmer 224 which has two heads 250 and 252 with openings that face in a substantially circumferential direction. The skimmer 224 is held stationary while the basket rotates in the direction of arrow 254, to facilitate the pick-up of excess water at the center of the basket. It is possible for the skimmer to also rotate, but it should rotate at a slower speed than the basket to effectively pick up water at the center.

FIGS. 13 and 14 illustrate another embodiment of the invention similar to that of FIG. 9, but which utilizes fiber bundles composed of numerous hollow fine fibers of semi-permeable membrane material instead of sheets of it. The fiber bundles 260 extend in a loop, with opposite ends molded into a header plate 262 which is fastened to a backing plate 263 to form apertures 264 for carrying away the permeate, or relatively pure water. The radially inner ends of the fibers extend through rings 266 that help prevent tangling of the fiber bundles. The rings are constructed of light material so they float in water and therefore tend to move radially inwardly when the fibers and ring are surrounded with water while the apparatus spins. The fibers can be attached to the header 262 by molding their ends into a block of header material and then slicing the block so that the ends of the hollow fibers are even at the surface 268. The use of the many hollow fibers results in an increased area of permeable material in a basket of given size. The orientation of the fibers in a substantially radial direction allows for a flow of a multi-component admixture to be purified, in a primarily radial direction, to tend to prevent by action of the centrifugal force, polarization layer build-up at the surface of the fibers.

FIG. 15 illustrates another embodiment of the invention which utilizes a semi-permeable membrane 270 that extends in a circumferential direction. In this embodiment of the invention, the feed water is applied to the radially outer surface 272 of the membrane so that fresh water must flow radially inwardly through the membrane 272 to the inner area 273, of the centrifuge basket. In this embodiment of the invention, the polarization layer which tends to build up on the outer surface of the membrane also tends to be thrown off therefrom by centrifugal force. It tends to be thrown off even though it is immersed in the rest of the water around the outside of the membrane, since the polarization layer is of greater density than the rest of the water. While the centrifugal force tends to prevent formation of the polarization layer, a flow of water past the membrane surface is also desirable. The flow is achieved by feeding in sea water or other admixture to be purified through one conduit 274 and removing the concentrated water which has flowed over the membrane, through another conduit 276. A baffle 278 is provided between the two conduits so that water must flow circumferentially around the membrane before it enters the outlet conduit 276. The combined effective centrifugal force and the scrubbing action of the flowing water over the membrane tends to reduce the polarization layer to a minimum. It can be understood, however, that unless many concentric membranes extending in the circumferential direction of membrane 270 are provided, only a very small membrane area can be included in a basket of given size.

The embodiments of the invention illustrated in FIGS. 9-15 are thus especially useful in preventing the build-up of polarization layers on the membrane surfaces. It may be noted that the embodiment illustrated in FIGS. 4 and 5 also utilizes a radially outward flow of water, which helps to prevent a polarization layer build-up by both the scrubbing action of the flowing water and the tendency of the heavier concentrated solution at the membrane surface to move out under centrifugal forces.

The invention can be used for a variety of applications, such as to concentrate juices or separate gases, and the apparatus of the invention can have a variety of forms. Thus, while particular embodiments of the invention have been illustrated and described, it should be understood that many additional modifications and variations may be resorted to by those skilled in the art, and the scope of the invention is limited only by a just interpretation of the following claims.

What is claimed is:

1. A semi-permeable membrane, reverse osmosis apparatus for separating at least part of one component from a multi-component admixture comprising:
   basket means mounted for rotation;
   semi-permeable membrane means disposed in said basket means;
   first conduit means for supplying said admixture to said membrane means;
   second conduit means for recovering concentrate which has flowed over said membrane means;
   means for recovering permeate which passes through said membrane means; and
   means for rotating said basket means at a high speed to create centrifugal forces that pressurize at least some of the fluid in said basket means;
   said membrane means having a surface extending with a radial directional component, and said first and second conduit means arranged so that said admixture flows with a radial directional component over said membrane means between said first and second conduit means.

2. The apparatus defined in claim 1 wherein:
   said first and second conduit means are arranged to direct said admixture in a primarily radially outward direction in flow over said membrane means.

3. The apparatus defined in claim 1 wherein:

said membrane means comprises a plurality of sheets of semi-permeable membrane material extending in a substantially radial direction.

4. Apparatus for separating at least part of one component from a multi-component admixture comprising:
   basket means mounted for rotation;
   semi-permeable membrane means disposed in said basket means, said membrane means including a plurality of hollow fibers of semi-permeable membrane material extending in a substantially radial direction;
   first conduit means for supplying said admixture to said membrane means;
   second conduit means for recovering concentrate which has flowed over said membrane means; and
   means for recovering permeate which passes through said membrane means;
   said membrane means having a surface extending with a radial directional component, and said first and second conduit means arranged so that said admixture flows with a radial directional component over said membrane means between said first and second conduit means.

5. Apparatus for separating a constituent from a fluid solution comprising:
   a plurality of membrane structures having semi-permeable membranes extending in a primarily radial direction;
   first and second conduit means disposed at radially opposite ends of said membrane structures to flow said fluid between them along a path which extends substantially radially along said membrane structures; and
   means for rotating said membrane structures and conduit means at a high speed to create centrifugal forces that urge material in a radial direction.

6. The apparatus defined in claim 5 wherein:
   said first conduit means is connected to a source of said fluid solution and is disposed radially inwardly from said second conduit means, whereby said solution flows in a radially outward direction.

7. In apparatus for separating at least part of one constituent from a multi-component liquid admixture, which includes means for rotating the admixture to create centrifugal forces that produce pressures which can force said constituent through a semi-permeable membrane, the improvement comprising:
   a semi-permeable membrane having a surface extending in a primarily radial direction; and
   means for directing a flow of said liquid admixture in a primarily radial direction past said membrane surface.

8. A reverse osmosis method for separating at least part of one component from a multi-component liquid admixture comprising:
   applying centrifugal force to said liquid admixture; and
   flowing said liquid admixture in a primarily radial direction along the surface of a semi-permeable membrane to effect passage of at least part of said one component through said membrane.

9. The method described in claim 8 wherein:
   said step of flowing includes flowing said admixture in a primarily outward radial direction along the surface of said membrane.

10. In apparatus for separating at least part of one component from a multi-component admixture which includes a rotatable basket holding a semi-permeable membrane and a conduit for feeding water to said membrane, the improvement comprising:
    skimming means mounted within said basket so that said basket rotates faster than said skimming means, said skimming means having an opening spaced a predetermined distance from the axis of rotation of said basket to receive excess admixture in said basket.

11. The improvement described in claim 10 wherein:
    said opening faces primarily circumferentially and in a direction opposite to the direction of rotation of said basket.

12. A method for separating a constituent from a fluid solution comprising:
    applying a quantity of said fluid solution out of which said constituent is to be separated to a first side of a semi-permeable membrane;
    rotating said membrane and said fluid solution about an axis of rotation at a speed to provide sufficient pressure to force said constituent therethrough;
    ejecting said constituent from a second side of said membrane in a direction tangential and opposite to the direction of rotation of said membrane; and
    ejecting the remaining fluid from which said constituent has been largely separated from said first side of said membrane in a direction tangential and opposite to the direction of rotation of said membrane.

13. Fluid separation apparatus for separating a purified solvent from a solution, while concentrating said solution by retaining solute materials, comprising:
    a basket having radially inner and outer portions and an axis of rotation;
    means connected to said basket for rotating it about said axis of rotation;
    conduit means extending to said basket for carrying said solution to said basket;
    membrane means for allowing the passage of said purified solvent therethrough upon the application thereagainst of said solution under pressure, said membrane means being disposed in said basket near the radially outer portion thereof;
    means for carrying away said purified solvent from said basket, disposed on a side of said membrane means opposite to the side on which said solution is disposed;
    concentrated solution passage means disposed on said basket for collecting said solution and solute materials remaining after the removal of said solvent; and
    nozzle means connected to said passage means for expelling fluids, said nozzle means mounted on said basket and directed substantially tangentially to the direction of rotation of said basket and in a direction opposite to the direction of rotation of said basket, whereby to enable the recovery of some of the energy supplied in causing rotation of the solution being processed.

14. Fluid separation apparatus for separating a purified solvent from a solution, while concentrating said solution by retaining solute materials, comprising:
    a basket having radially inner and outer portions and an axis of rotation;
    means connected to said basket for rotating it about said axis of rotation;
    conduit means extending to said basket for carrying said solution to said basket;
    membrane means for allowing the passage of said purified solvent therethrough including a multiplicity of layers of semi-permeable membrane material of annular shape, the plane of the layers of membrane material extending substantially normal to said axis of rotation of the basket, the space between at least some of said layers of membrane material defining solution channels for carrying said solution being processed to the areas on one face of the layers of membrane material, and the space between at least some of said layers of membrane material defining purified solvent channels for carrying away purified solvent which flows through said membranes; and
    means coupled to said purified solvent channels for carrying away said purified solvent from said basket.

15. Fluid separation apparatus for separating a purified solvent from a solution, while concentrating said solution by retaining solute materials, comprising:
    a basket having a radially inner and outer portion and an axis of rotation;
    means connected to said basket for rotating it about said axis of rotation;
    conduit means extending to said basket for carrying said solution to said basket;
    membrane means for allowing the passage of said purified solvent therethrough, including a plurality of layers of semi-permeable material wound spirally with respect to said axis of rotation of said basket; and means for carrying away said purified solvent from said basket, disposed on a side of said membrane means opposite to the side on which said solution is disposed.

16. Fluid separation apparatus for separating a purified solvent from a solution, while concentrating said solution by retaining solute materials, comprising:
- a basket having radially inner and outer portions and an axis of rotation;
- means connected to said basket for rotating it about said axis of rotation;
- conduit means extending to said basket for carrying said solution to said basket;
- membrane means for allowing the passage of said purified solvent therethrough including a multiplicity of tubes disposed in the radially outward portions of said basket and in said solution being processed, said tubes extending substantially parallel to the axis of said basket, each of said tubes having a radially outer portion of semi-permeable membrane material for passing substantially only purified solvent therethrough, and an axial portion for carrying away purified solvent; and
- means coupled to said tubes for removing said purified solvent from said basket.

17. Fluid separation apparatus for separating a purified solvent from a solution, while concentrating said solution by retaining solute materials, comprising:
- a basket having radially inner and outer portions and an axis of rotation;
- means connected to said basket for rotating it about said axis of rotation;
- conduit means extending to said basket for carrying said solution to said basket;
- membrane means for allowing the passage of said purified solvent therethrough upon the application thereagainst of said solution under pressure, said membrane means being disposed in said basket near the radially outer portion thereof;
- means for carrying away said purified solvent from said basket, disposed on a side of said membrane means opposite to the side on which said solution is disposed;
- impeller means disposed in said basket for gathering said solution in said basket;
- brake means connected to said impeller means for preventing said impeller means from rotating at the speed of said basket; and
- means for carrying fluid from said impeller means.

18. Apparatus for generating fresh water by forcing impure water against a semi-permeable membrane which allows primarily pure water to pass while blocking the flow of dissolved solids therein, comprising:
- a basket for holding water, said basket having an axis of rotation;
- means leading to said basket for feeding impure water into said basket;
- motor means for rapidly rotating said basket around its axis of rotation;
- support means disposed on said basket near its radially outer portion, and extending about said basket, for containing water in said basket against centrifugal forces on said water;
- a membrane structure disposed near the periphery of said basket and at a position inwardly from said support means for blocking the flow of impurities while allowing the flow of pure water therethrough;
- pure water collecting means connected to one side of said membrane apparatus for collecting pure water flowing therethrough and ejecting it from said basket; and
- impure water collecting means connected to the water within said basket on the side of said membrane structure containing primarily impure water, for ejecting water from said basket as it rotates;
- at least one of said water collecting means including nozzle means directed substantially tangentially to the direction of rotation of said basket and opposite to the direction of rotation of said basket, whereby to employ the energy of rotation of ejected water to help maintain the rotation of said basket.

19. Apparatus for generating fresh water by forcing impure water against a semi-permeable membrane which allows primarily pure water to pass while blocking the flow of dissolved solids therein, comprising:
- a basket for holding water, said basket having an axis of rotation;
- means leading to said basket for feeding impure water into said basket;
- motor means for rapidly rotating said basket around its axis of rotation;
- support means disposed on said basket near its radially outer portion, and extending about said basket, for containing water in said basket against centrifugal forces on said water;
- a membrane structure for blocking the flow of impurities while allowing the flow of pure water, including at least one sheet of semi-permeable material extending spirally with respect to said axis of said basket;
- pure water collecting means connected to one side of said membrane apparatus for collecting pure water flowing therethrough and ejecting it from said basket; and
- impure water collecting means connected to the water within said basket on the side of said membrane structure containing primarily impure water, for ejecting water from said basket as it rotates.

20. Apparatus for generating fresh water by forcing impure water against a semi-permeable membrane which allows primarily pure water to pass while blocking the flow of dissolved solids therein, comprising:
- a basket for holding water, said basket having an axis of rotation;
- means leading to said basket for feeding impure water into said basket;
- motor means for rapidly rotating said basket around its axis of rotation;
- support means disposed on said basket near its radially outer portion, and extending about said basket, for containing water in said basket against centrifugal forces on said water;
- a membrane structure for blocking the flow of impurities while allowing the flow of pure water including a stack of ring-shaped membranes, each membrane having an area oriented normal to said axis of rotation of said basket, impure water channels disposed on one side of each membrane for carrying impure water to one side of each membrane, and pure water channels disposed on a side of each membrane opposite said impure water channels for carrying away pure water passing through said membranes;
- means coupled to said impure water channels for allowing the exit of primarily impure water from said basket; and
- means coupled to said pure water channels for allowing the exit of pure water from said basket.

* * * * *